Figure 3:
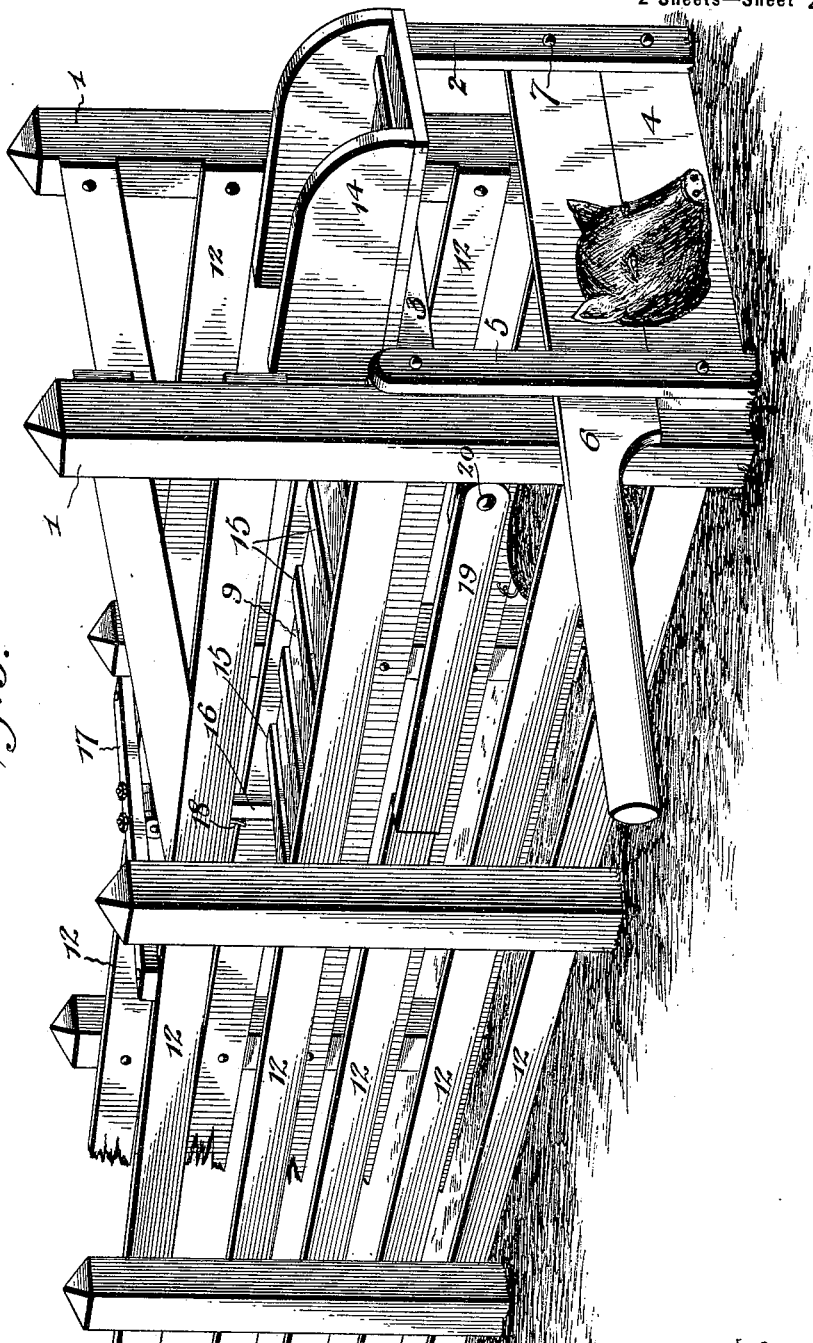

No. 634,139. Patented Oct. 3, 1899.
J. W. HARRELSON.
HOG TRAP AND LOADING DEVICE.
(Application filed Sept. 30, 1897.)
(No Model.)
2 Sheets—Sheet 1.
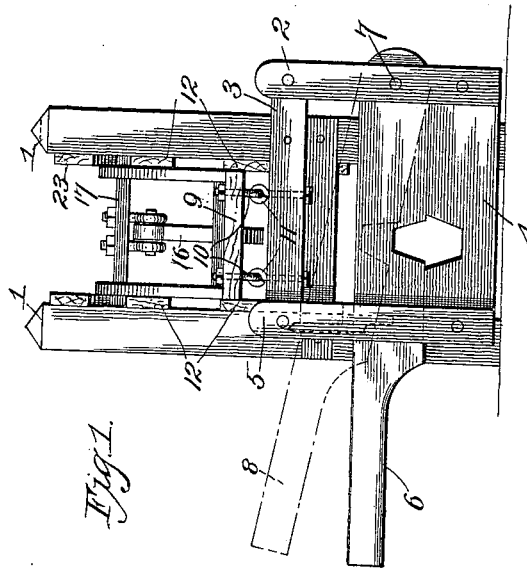
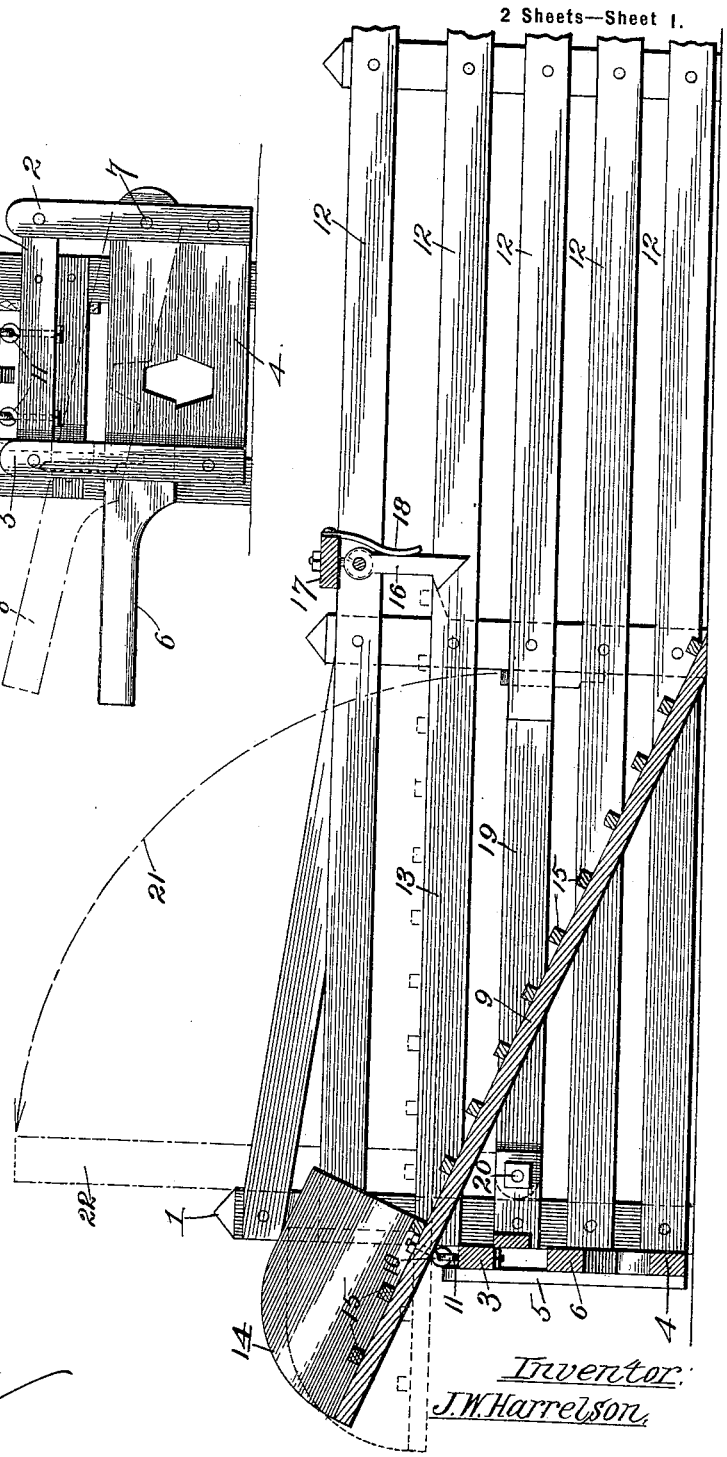
Witnesses:
Inventor:
J. W. Harrelson.
By Higdon & Higdon
attys
THE NORRIS PETERS CO., PHOTO-LITHO., WASHINGTON, D. C.

No. 634,139. Patented Oct. 3, 1899.
J. W. HARRELSON.
HOG TRAP AND LOADING DEVICE.
(Application filed Sept. 30, 1897.)
(No Model.) 2 Sheets—Sheet 2.

Witnesses

Inventor,
James W. Harrelson.
By his Attorneys,
C. A. Snow & Co.

UNITED STATES PATENT OFFICE.

JAMES W. HARRELSON, OF BELTON, MISSOURI.

HOG TRAP AND LOADING DEVICE.

SPECIFICATION forming part of Letters Patent No. 634,139, dated October 3, 1899.

Application filed September 30, 1897. Serial No. 653,657. (No model.)

*To all whom it may concern:*

Be it known that I, JAMES W. HARRELSON, of Belton, Cass county, Missouri, have invented certain new and useful Improvements in Hog-Traps and Hog-Loading Devices, of which the following is a full, clear, and exact description, reference being had to the accompanying drawings, forming a part thereof.

My invention relates to hog-traps, and has for its object to provide a combined trap for catching and holding hogs while ringing, branding, and castrating them and a chute for facilitating the loading thereof upon cars and other vehicles; and the object in view is to provide a device of this class wherein the hog catching and holding members are permanently positioned with relation to the frame, which is common to the trap and chute, and wherein another element, also common to the two uses of the device, is convertible to adapt it to perform the functions of a trap-cover and a gang-plank.

Further objects and advantages of this invention will appear in the following description, and the novel features thereof will be particularly pointed out in the appended claims.

In the drawings, Figure 1 is a front view of a hog holding and loading apparatus constructed in accordance with my invention. Fig. 2 is a longitudinal sectional view of the same. Fig. 3 is a perspective view of the apparatus with the parts arranged for holding hogs successively during the performance of one or the other of the above-mentioned operations.

Similar reference characters indicate corresponding parts in all the figures of the drawings.

The frame of the apparatus, which may be arranged in communication with a hog-pen or other inclosure, is constructed of spaced posts or uprights connected by side bars 12 or the equivalent thereof, and mounted contiguous to the front uprights 1 are the members of a hog holding and catching device, including a stationary jaw 4 and a vertically-movable (preferably pivotal) jaw 6, said fixed and movable jaws being provided in their contiguous edges with registering seats to receive and engage a hog in rear of the ears, said movable jaw being extended laterally of the frame to form a handle or grip whereby said jaw may be operated. The hog catching and holding device is arranged at the end of the frame, whereby when a hog which has been engaged and held during the performance of the desired operation, such as ringing or branding, is released by the elevation of the movable jaw of the clamp said hog will escape from the apparatus through the interval between the jaws, and the other hogs in the frame, seeing the escape of the former, will likewise attempt to pass through the interval between the jaws, and thus place themselves successively in position to be caught by the operator. I preferably construct the jaws of normally horizontal planks, as shown, the lower or stationary plank being arranged with its cut-away portion or seat elevated above the floor or bottom of the frame, whereby a hog in approaching the jaws to escape therebetween extends his head through the interval sufficiently in advance of his fore legs to enable him to be grasped by the lowering of the movable jaw without crippling or otherwise causing injury.

In practice auxiliary uprights or standards 2 and 5 are located parallel with and slightly in advance of the uprights 1 and are connected by a cross-piece 3, which extends transversely across the space between said uprights 1, the lower edge 4 being terminally attached to said auxiliary uprights or standards and the movable jaw 6 being pivoted, as at 7, to the standard 2 and operating in the parallel space between the adjacent faces of the upright 1 and the standard 5 and being limited in this swinging movement in one direction by the jaw 4 and in the other direction by the cross-piece 3. The movable jaw is shown elevated in dotted lines, as at 8 in Fig. 1, and to facilitate branding or other operation necessitating access to the portion within the frame of a held animal I employ a movable side-wall section or bar 19, pivoted, as at 20, contiguous to one of the front uprights 1 and adapted to swing in a path indicated by the dotted line 21 to the upright position shown at 22.

In order to prevent crowding and mounting of the hogs at a point adjacent to the holding device, I employ a chute cover or roof 9, of which the front portion is supported by the cross-bar 3, and by hingedly or pivotally mounting this roof or cover, which is equal in width with the interior of the frame, upon said cross-bar 3 by means of interlocking eyes 10 and 11 I am enabled to lower the same at its rear or inner end to form an inclined gang-plank adapted to be ascended by the hogs to facilitate loading into vehicles, such as cars. Therefore to adapt said roof or cover to perform its function as a gang-plank I provide it upon its upper surface with transverse cleats 15, forming footholds, and extend the same forward beyond the pivotal point or beyond the plane of the holding device and provide this forward extension with side guards 14 for preventing hogs occupying this portion of the gang-plank from escaping or falling laterally. In Fig. 2 the convertible chute-cover and gang-plank is shown in full lines in position to operate as a gang-plank and in dotted lines at 13 in its position to operate as a chute cover or roof, the same being held in the latter or horizontal position by means of a support, consisting in the construction illustrated of a swinging latch 16, suspended from a cross-bar 17, spanning the frame at an intermediate point, said latch being actuated by a spring 18 and being provided with a shoulder upon which the rear or inner end of the convertible chute-cover and gang-plank may rest.

My object in extending the convertible cover forward in advance of the plane of the hog-holding device is to provide for depression of this exterior or front end when traversed by a hog to allow it to settle upon the floor or bottom of a car or other vehicle, and thus obviate the forming of a step at the outlet or discharge end of the plank. As an animal traverses the plank and reaches a point beyond the plane of the hog catching and holding device said plank tilts to allow the front end thereof to bear upon the floor of the vehicle, whereupon the animal is guided directly into the vehicle and may be caused to so pass without urging and without exposure to accident.

Thus from the foregoing description it will be seen that I have provided, in a combined hog-trap and loading-chute, a permanently-positioned clamp or hog catching and holding device, the displacement of which is not necessary in order to operate the device as a chute or loader, and have also provided an apparatus wherein the element constituting the convertible chute-cover and gang-plank is permanently attached and is adapted in its capacity as a gang-plank to tilt to facilitate the transfer of animals from the surface of the gang-plank to the floor of the car or other vehicle.

When the front or extended end of the gang-plank is depressed, the rear end thereof is automatically engaged and supported by the latch 16, provided such depression is sufficient to arrange the gang-plank in a horizontal position. The side guards 14 constitute extensions of the side walls of the frame when the convertible chute-cover is in use as a gang-plank.

In practice various changes in the form, proportion, and the minor details of construction may be resorted to without departing from the spirit or sacrificing any of the advantages of the invention.

Having described my invention, what I claim is—

1. A hog-trap and stock-loading apparatus, comprising a frame open at one end, a tilting gang-plank fulcrumed at a point intermediate its length upon the frame, for arrangement at one end on the floor of the trap, and projecting at the other end beyond the end of the frame, to adapt said projecting end for depression, when loaded, into contact with the floor of a vehicle and means for holding said projecting end depressed.

2. A hog trap and loading apparatus, comprising a frame having side walls and open at one end, a tilting convertible gang-plank and chute-cover fulcrumed at a point intermediate of its length and projecting beyond one end of the frame for terminal depression to bear upon the floor or bottom of a vehicle, that portion of the portable gang-plank and cover which projects beyond the end of the frame having upstanding side guards, and movable means for engaging the rear or inner end of said convertible gang-plank and chute-cover.

In testimony whereof I affix my signature in the presence of two witnesses.

JAMES W. HARRELSON.

Witnesses:
M. R. REMLEY,
G. Y. THORPE.